United States Patent
Liang et al.

(10) Patent No.: US 10,488,701 B2
(45) Date of Patent: Nov. 26, 2019

(54) DISPLAY DEVICE AND DISPLAY METHOD FOR DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Fei Liang, Beijing (CN); Jingjun Du, Beijing (CN); Lingyu Sun, Beijing (CN); Xiuyun Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/115,694

(22) Filed: Aug. 29, 2018

(65) Prior Publication Data
US 2019/0204634 A1      Jul. 4, 2019

(30) Foreign Application Priority Data
Jan. 3, 2018   (CN) .......................... 2018 1 0003781

(51) Int. Cl.
*G02F 1/1335* (2006.01)
*G02F 1/13357* (2006.01)
*G02F 1/13363* (2006.01)

(52) U.S. Cl.
CPC ........ *G02F 1/1336* (2013.01); *G02F 1/13363* (2013.01); *G02F 1/133504* (2013.01); *G02F 1/133514* (2013.01); *G02F 1/133528* (2013.01); *G02F 1/133553* (2013.01); *G02F 2001/133616* (2013.01); *G02F 2001/133638* (2013.01); *G02F 2203/02* (2013.01); *G02F 2413/02* (2013.01); *G02F 2413/06* (2013.01)

(58) Field of Classification Search
CPC ............. G02F 1/1336; G02F 1/133504; G02F 2001/133638; G02F 1/13363; G02F 1/133528; G02F 2413/02; G02F 1/133553; G02F 1/133514; G02F 2203/02; G02F 2001/133616; G02F 2413/06
See application file for complete search history.

(56) References Cited

U.S. PATENT DOCUMENTS

2016/0274421 A1*  9/2016  Hirakata ........... G02F 1/133553
2016/0363292 A1* 12/2016  Yang ........................ F21V 14/02

* cited by examiner

*Primary Examiner* — Donald L Raleigh
(74) *Attorney, Agent, or Firm* — Armstrong Teasdale LLP

(57) ABSTRACT

Embodiments of the present disclosure relate to a display device and a display method for the display device. The display device includes a reflective display panel and an optical device adjacent to the reflective display panel, wherein the optical device includes a light source and an actuation mechanism configured for actuating the light source.

15 Claims, 3 Drawing Sheets

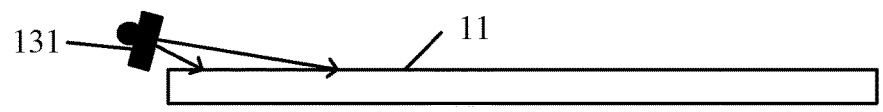
FIG. 4A
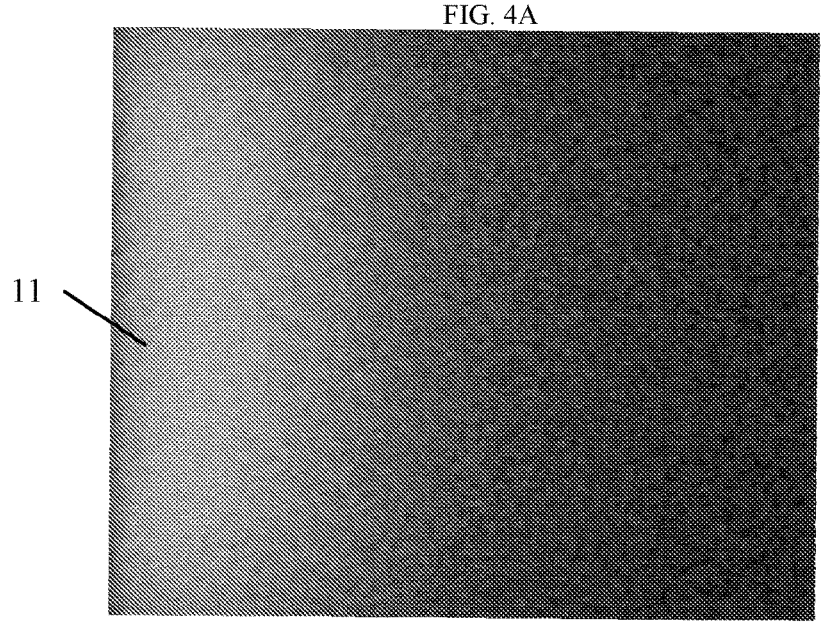
FIG. 4B
501 — Change the illumination position of light emitted by the light source on the reflective display panel during display,
FIG. 5

DISPLAY DEVICE AND DISPLAY METHOD FOR DISPLAY DEVICE

CROSS REFERENCE TO RELATED APPLICATIONS

This patent application claims the benefit and priority of Chinese Patent Application No. 201810003781.8 filed on Jan. 3, 2018, the disclosure of which is incorporated by reference herein in its entirety as part of the present application.

BACKGROUND

Embodiments of the present disclosure relate to the field of display technologies, and in particular, to a display device and a display method for the display device.

Display devices typically include transmissive display devices and reflective display devices. For example, a reflective display device may be constructed by providing a reflective material under a liquid crystal panel to replace a backlight of a transmissive display panel. In the case that the ambient light is sufficient, for example, in a sunny outdoor, the screen is illuminated with reflection of ambient light from the reflective material.

BRIEF DESCRIPTION

Embodiments of the present disclosure provide a display device and a display method for the display device.

An aspect of the present disclosure provides a display device including a reflective display panel and an optical device adjacent to the reflective display panel. The optical device includes a light source and an actuation mechanism configured for actuating the light source.

In an embodiment of the present disclosure, the display device further includes a frame surrounding the reflective display panel, and the optical device is attached to the frame.

In an embodiment of the present disclosure, the actuation mechanism is configured to enable the light source to rotate about an axis parallel to an edge of the reflective display panel adjacent to the light source within a predetermined range of angles. The predetermined range of angles is configured such that light emitted by the light source may scan the entire reflective display panel.

In an embodiment of the present disclosure, the actuation mechanism is further configured to rotate the light source at a predetermined frequency.

In an embodiment of the present disclosure, the predetermined frequency is greater than a flash critical fusion frequency of a human eye.

In an embodiment of the present disclosure, the actuation mechanism is configured to decrease a rotational speed of the light source as an incident angle of light emitted by the light source on the reflective display panel increases.

In an embodiment of the present disclosure, the light source includes a strip light source.

In an embodiment of the present disclosure, the actuation mechanism includes a stepper motor or a swing motor.

In an embodiment of the present disclosure, the actuation mechanism is located at at least one end of the strip light source.

Another aspect of the present disclosure provides a display method for a display device according to any of the embodiments described herein, the display method includes changing the illumination position of light emitted by the light source on the reflective display panel during display.

In an embodiment of the present disclosure, changing the illumination position of light emitted by the light source on the reflective display panel includes rotating the light source about an axis parallel to an edge of the reflective display panel adjacent to the light source within a predetermined range of angles. The predetermined range of angles is configured such that light emitted by the light source may scan the entire reflective display panel.

In an embodiment of the present disclosure, the display method further includes rotating the light source at a predetermined frequency.

In an embodiment of the present disclosure, the predetermined frequency is greater than a flash critical fusion frequency of a human eye.

In an embodiment of the present disclosure, the display method further includes decreasing a rotational speed of the light source as an incident angle of light emitted by the light source on the reflective display panel increases.

Further aspects and areas of applicability will become apparent from the description provided herein. It should be understood that various aspects of this application may be implemented individually or in combination with one or more other aspects. It should also be understood that the description and specific examples herein are intended for purposes of illustration only and are not intended to limit the scope of the present application.

BRIEF DESCRIPTION OF THE DRAWINGS

The drawings described herein are for illustrative purposes only of selected embodiments and not all possible implementations, and are not intended to limit the scope of the present application, wherein:

FIG. 4A shows a schematic view of light emitted from the light source incident on the reflective display panel at a large incident angle;

FIG. 4B shows a schematic view of luminance distribution on the reflective display panel when light emitted from the light source is incident on the reflective display panel at a large incident angle; and FIG. 5 shows a flowchart of an example display method according to an embodiment of the present disclosure.

Corresponding reference numerals indicate corresponding parts or features throughout the several views of the drawings.

DETAILED DESCRIPTION

Figure 1:
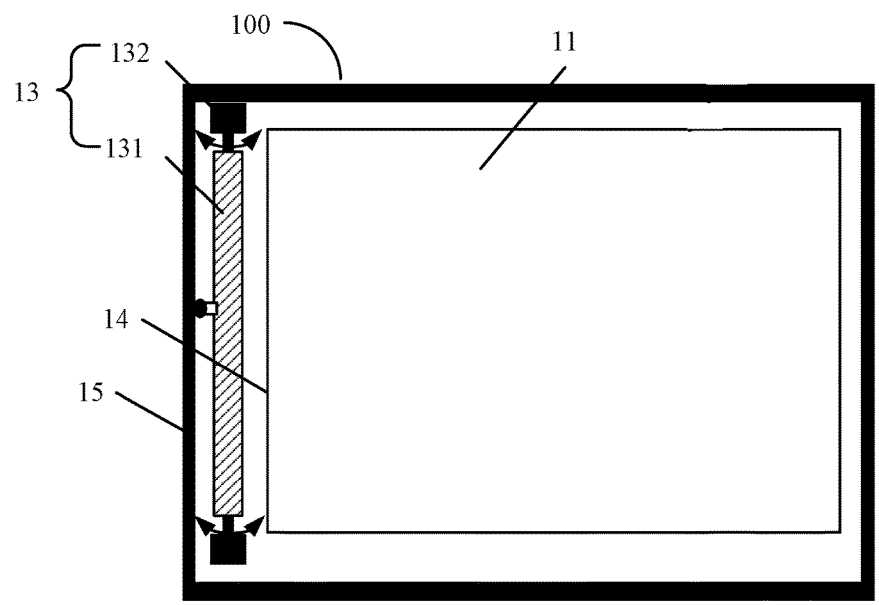
FIG. 1 shows a schematic view of an example display device according to an embodiment of the present disclosure.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "include" and grammatical variations are to be interpreted inclusively rather than exclusively, unless such a construction is clearly prohibited from the context. Where used herein the term "examples" particularly when followed by a listing of terms is merely exemplary and illustrative, and should not be deemed to be exclusive or comprehensive.

As described above, for the reflective display device, the screen thereof may be illuminated by the reflected ambient light using a reflective material in the case that the ambient light is sufficient. However, under the situation that ambient light is weak, such as indoors or at night, the weak ambient light to be reflected back is not sufficient enough to illuminate the screen of the reflective display device. Therefore, such a reflective display device has a strong dependence on the intensity of ambient light, and the place of use thereof is thus limited. In order to avoid this problem, a front optical system may be provided above the reflective display device for illuminating the screen from the display side of the display device under the situation that the ambient light is weak, so as to enhance display luminance. In order not to affect the display of the display device, the front optical system is usually provided in a peripheral region of the display device, which may cause a problem that the luminance of the region close to the light source is higher while the luminance of the region far away from the light source is lower, thereby causing uneven display of the screen.

An aspect of the present disclosure provides a display device. The display device includes a reflective display panel and optical device adjacent to the reflective display panel. The optical device includes a light source and an actuation mechanism configured for actuating the light source. According to an embodiment of the present disclosure, in the case that the display device is applied to a dark environment, the light source may be turned on and driven to move by the actuation mechanism such that light emitted by the light source may scan (for example, periodically) the surface of the reflective display panel, whereby the luminance uniformity of the reflective display panel may be improved.

Illustratively, the actuation mechanism may rotate the light source within a predetermined range of angles such that the light emitted by the light source periodically scans the entire reflective display panel. Therefore, the display device provided according to an embodiment of the present disclosure may achieve a display effect with high uniformity.

FIG. 1 shows a schematic view of an example display device 100 according to an embodiment of the present disclosure. As shown in FIG. 1, the display device 100 may include a reflective display panel 11 and an optical device 13 adjacent to the reflective display panel 11, and the optical device 13 may include a light source 131 and an actuation mechanism 132 configured for actuating the light source 131. In an embodiment of the present disclosure, the optical device 13 is adjacent to an edge 14 of the reflective display panel 11.

It should be understood that the present disclosure does not limit the specific type of the reflective display panel 11, and any display panel that does not have self-illuminating capability may be used to implement the technical solution of the present disclosure. For example, the reflective display panel may include, but is not limited to, a liquid crystal display panel or an electronic ink display panel.

In an embodiment of the present disclosure, the actuation mechanism 132 may be configured to enable the light source 131 to rotate about an axis parallel to the edge 14 of the reflective display panel 11 adjacent to the light source 131 within a predetermined range of angles, and the predetermined range of angles may be configured such that light emitted from the light source 131 may scan the entire reflective display panel 11. According to an embodiment of the present disclosure, the predetermined range of angles may depend on factors such as the size (for example, length, width, and area) of the reflective display panel 11, the angle of divergence of the light source 131, the distance between the light source 131, and the reflective display panel 11.

It should be understood that the size of the light source 131 along an extending direction of the edge 14 of the reflective display panel 11 adjacent to the light source 131 is not limited in embodiments of the present disclosure, and the size may be appropriately selected according to actual needs. For example, the size of the light source 131 may be substantially equal to the length of the edge 14, and may also be less than the length of the edge 14.

In an exemplary embodiment of the present disclosure, the reflective display device 100 may further include a frame 15 surrounding the reflective display panel 11, and the optical device 13 is attached to the frame 15. With this configuration, the structure of the display device 100 may be made more compact.

In an exemplary embodiment of the present disclosure, the light source 131 may be rotated at a predetermined frequency. The predetermined frequency may be greater than the flash critical fusion frequency of a human eye, such as greater than 60 Hz. In the case that the frequency of the rotation of the light source 131 is greater than the flash critical fusion frequency of the human eye, the human eye does not feel the screen flicker, thereby improving the visual comfort of the human eye.

In an alternative embodiment of the present disclosure, the actuation mechanism 132 may also be configured such that the rotational speed of the light source 131 decreases as an incident angle of light emitted by the light source 131 on the reflective display panel 11 increases. In this way, the scanning speed of the light emitted by the light source 131 on the reflective display panel 11 gradually decreases from the side of the reflective display panel 11 close to the light source 131 toward the side far away from the light source 131, which may further improve the luminance uniformity of the reflective display panel 11.

Returning again to FIG. 1, in an embodiment of the present disclosure, the light source 131 may be any type of light source suitable for the display device. By way of example, the light source 131 may include a strip light source, such as a strip LED.

The actuation mechanism 132 may include a stepper motor or a swing motor that may be provided at the ends of the strip light source, such as at both ends of the strip light source. Of course, other embodiments are also feasible, for example, the actuation mechanism 132 is provided at an intermediate position of the strip light source.

In an embodiment of the present disclosure, the display device 100 may further include a fastening mechanism adapted to fix the light source 131 onto the actuation mechanism 132 such that the actuation mechanism 132 actuates the light source 131 by means of the fastening mechanism. For example, the actuation mechanism 132 enables the light source 131 to rotate about an axis parallel to the edge of the reflective display panel 11.

Figure 2:
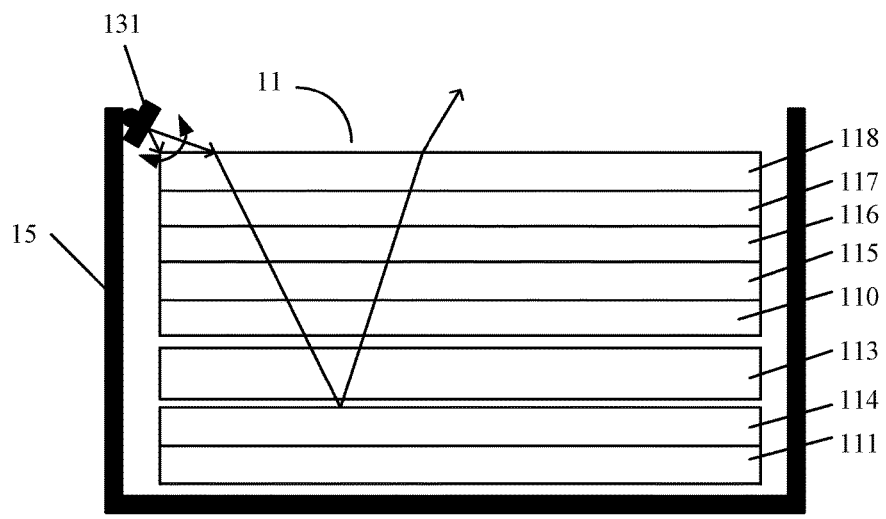
FIG. 2 shows a schematic cross-sectional view of the display device according to the embodiment of the present disclosure.

FIG. 2 shows a schematic cross-sectional view of the display device 100 according to an embodiment of the present disclosure.

In the embodiment shown in FIG. 2, the reflective display panel 11 may be a reflective liquid crystal display panel, including a color film substrate 110 and an array substrate 111 provided oppositely, a liquid crystal layer 113 provided between the color filter substrate 110 and the array substrate 111, a reflective layer 114 provided between the liquid crystal layer 113 and the array substrate 111, a scattering film 115 provided on a side of the color film substrate 110 far away from the liquid crystal layer 113, and a polarizing layer provided on a side of the scattering film 115 far away from the color filter substrate 110. In an exemplary embodiment of the present disclosure, the polarizing layer may include a quarter wave plate 116, a half wave plate 117, and a linear polarizer 118 which are sequentially stacked on the scattering film.

As shown in FIG. 2, the light emitted from the light source 131 is incident on the reflective layer 114 after interacting with the respective layers of the reflective display panel 11, reflected by the reflective layer 114, then reversely passes through the respective layers of the reflective display panels 11, and thus may exit from the reflective display panel 11. According to the display device provided by the embodiment of the present disclosure, the light emitted by the light source 131 may scan the entire reflective display panel 11 under the driving of the actuation mechanism 132 so that the light may enter the entire reflective display panel 11 and exit out of the display region 10 after being reflected by the reflective layer 114, whereby the display uniformity of the reflective display panel 11 may be improved.

Figure 3A:
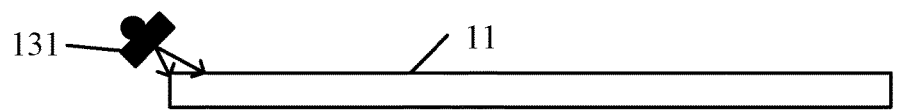
FIG. 3A shows a schematic view of light emitted from an example light source incident on a display region at a small incident angle.
Figure 3B:
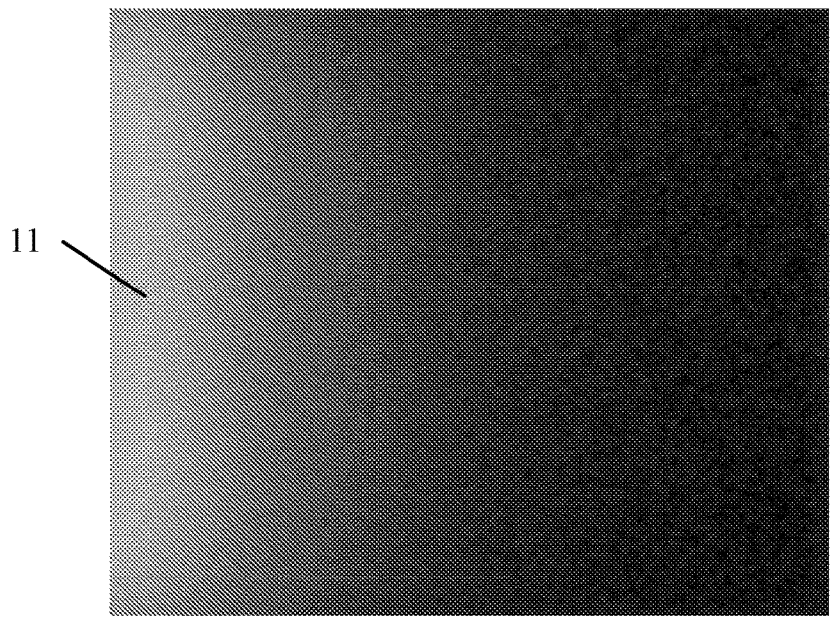
FIG. 3B shows a schematic view of luminance distribution on an example reflective display panel when light emitted from the light source is incident on the reflective display panel at a small incident angle.

FIG. 3A shows a schematic view of light emitted from the light source incident on the reflective display panel at a small incident angle. FIG. 3B shows a schematic view of luminance distribution on the reflective display panel when light emitted from the light source is incident on the reflective display panel at a small incident angle. FIG. 4A shows a schematic view of light emitted from the light source incident on the reflective display panel at a large incident angle. FIG. 4B shows a schematic view of luminance distribution on the reflective display panel when light emitted from the light source is incident on the reflective display panel at a large incident angle.

As shown in FIGS. 3A and 3B, when the actuation mechanism 132 drives the light source 131 to rotate such that light emitted from the light source 131 is incident on the reflective display panel 11 at a small incident angle (FIG. 3A), the bright bands on the reflective display panel 11 are located on the side close to the light source 131 (FIG. 3B). As shown in FIGS. 4A and 4B, when the actuation mechanism 132 drives the light source 131 to rotate such that the incident angle of the light emitted from the light source 131 on the reflective display panel 11 is increased (FIG. 4A), the bright band on the reflective display panel 11 is moved from the side close to the light source 131 toward the side far away from the light source 131 (FIG. 4B). In this way, as the light source 131 periodically rotates, the light emitted by the light source 131 may periodically scan the entire reflective display panel 11, so that the luminance uniformity of the reflective display panel 11 may be improved.

Another aspect of an embodiment of the present disclosure provides a display method for a display device. The display method may be used for the display device according to the present disclosure, such as the display device according to one or more embodiments disclosed in detail herein. Thus, for an alternative embodiment of the display method, reference may be made to embodiments of the display device. The display method includes the steps described below, which may be performed in a given order or in a different order. In addition, additional method steps not listed may be provided. Furthermore, two or more or even all of the method steps might be performed at least partially simultaneously. Furthermore, a method step might be performed twice or even more than twice, repeatedly.

FIG. 5 shows a flowchart of the display method according to the embodiment of the present disclosure. As shown in FIG. 5, the display method includes the step 501 of changing the illumination position of the light emitted by the light source on the reflective display panel during display.

In the embodiment, by changing the illumination position of the light emitted by the light source on the reflective display panel, the light emitted by the light source may scan the reflective display panel, thereby improving the luminance uniformity of the reflective display panel.

In an exemplary embodiment, the light source may rotate about an axis parallel to an edge of the reflective display panel adjacent to the light source within a predetermined range of angles. In an embodiment of the present disclosure, the predetermined range of angles is configured such that the light emitted by the light source may scan the entire reflective display panel.

In an exemplary embodiment, the display method further includes rotating the light source at a predetermined frequency. Alternatively, the predetermined frequency is greater than a flash critical fusion frequency of the human eye. In the embodiment of the present disclosure, the light source is rotated at a predetermined frequency, such that the light emitted from the light source may periodically scan the reflective display panel, whereby the luminance uniformity of the reflective display panel may be improved.

In an embodiment of the present disclosure, the display method further includes decreasing a rotational speed of the light source as an incident angle of light emitted by the light source on the reflective display panel increases.

The foregoing description of the embodiment has been provided for purpose of illustration and description. It is not intended to be exhaustive or to limit the application. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the application, and all such modifications are included within the scope of the application.

What is claimed is:

1. A display device comprising a reflective display panel and an optical device adjacent to the reflective display panel, wherein the optical device comprises a light source and an actuation mechanism configured for actuating the light source, wherein the actuation mechanism is configured to enable the light source to rotate about an axis parallel to an edge of the reflective display panel adjacent to the light source within a predetermined range of angles, and wherein the predetermined range of angles is configured such that light emitted by the light source scans the entire reflective display panel.

2. The display device according to claim 1, further comprising a frame surrounding the reflective display panel, the optical device attached to the frame.

3. The display device according to claim 1, wherein the actuation mechanism is further configured to rotate the light source at a predetermined frequency.

4. The display device according to claim 3, wherein the predetermined frequency is greater than a flash critical fusion frequency of a human eye.

5. The display device according to claim 1, wherein the actuation mechanism is configured to decrease a rotational speed of the light source as an incident angle of light emitted by the light source on the reflective display panel increases.

6. The display device according to claim 1, wherein the light source comprises a strip light source.

7. The display device according to claim 6, wherein the actuation mechanism comprises one of a stepper motor and a swing motor.

8. The display device according to claim 7, wherein the actuation mechanism is located at at least one end of the strip light source.

9. A display method for the display device according to claim 1, the display method comprising changing the illumination position of light emitted by the light source on the reflective display panel during display, wherein changing the illumination position of light emitted by the light source on the reflective display panel comprises:

rotating the light source about an axis parallel to an edge of the reflective display panel adjacent to the light source within a predetermined range of angles, wherein the predetermined range of angles is configured such that light emitted by the light source scans the entire reflective display panel.

10. The display method according to claim 9, further comprising rotating the light source at a predetermined frequency.

11. The display method according to claim 10, wherein the predetermined frequency is greater than a flash critical fusion frequency of a human eye.

12. The display method according to claim 10, further comprising decreasing a rotational speed of the light source as an incident angle of light emitted by the light source on the reflective display panel increases.

13. The display method according to claim 9, wherein the display device further comprises a frame surrounding the reflective display panel, and wherein the optical device is attached to the frame.

14. The display method according to claim 9, wherein the light source comprises a strip light source.

15. The display method according to claim 14, wherein the actuation mechanism is located at at least one end of the strip light source.

* * * * *